United States Patent
Strock et al.

(10) Patent No.: US 10,458,256 B2
(45) Date of Patent: Oct. 29, 2019

(54) THERMAL-SPRAYED BONDING OF A CERAMIC STRUCTURE TO A SUBSTRATE

(71) Applicant: UNITED TECHNOLOGIES CORPORATION, Hartford, CT (US)

(72) Inventors: Christopher W Strock, Kennebunk, ME (US); Paul M Lutjen, Kennebunkport, ME (US)

(73) Assignee: United Technologies Corporation, Farmington, CT (US)

( * ) Notice: Subject to any disclaimer, the term of this patent is extended or adjusted under 35 U.S.C. 154(b) by 950 days.

(21) Appl. No.: 14/923,574

(22) Filed: Oct. 27, 2015

(65) Prior Publication Data

US 2016/0123160 A1 May 5, 2016

Related U.S. Application Data

(60) Provisional application No. 62/072,478, filed on Oct. 30, 2014.

(51) Int. Cl.
*F01D 5/28* (2006.01)
*B32B 3/12* (2006.01)
(Continued)

(52) U.S. Cl.
CPC ............. *F01D 5/288* (2013.01); *B32B 3/12* (2013.01); *B32B 7/12* (2013.01); *B32B 9/005* (2013.01);
(Continued)

(58) Field of Classification Search
CPC ........ F01D 5/288; F01D 11/127; F01D 11/12; F01D 25/08; F01D 11/08; F01D 9/041; B32B 37/12; B32B 7/12; B32B 9/041; B32B 9/005; B32B 3/12; B32B 2603/00; B32B 2307/304; B32B 2255/20; B32B 2255/06; B32B 2255/00; B32B 2250/02; C23C 4/12; F05D 2250/283; F05D 2230/312; F05D 2300/22; F05D 2300/20; F05D 2240/12; F05D 2240/30; F05D 2300/5023; F05D 2300/611;
(Continued)

(56) References Cited

U.S. PATENT DOCUMENTS

| | | | |
|---|---|---|---|
| 3,831,258 A | 8/1974 | Elbert et al. | |
| 4,405,284 A * | 9/1983 | Albrecht | C23C 4/02 415/173.4 |

(Continued)

FOREIGN PATENT DOCUMENTS

| | | |
|---|---|---|
| EP | 1491657 A1 | 12/2004 |
| EP | 2174740 A1 | 4/2010 |

(Continued)

OTHER PUBLICATIONS

Japanese Office Action for Application No. 2015-211469 dated Aug. 19, 2016.

(Continued)

*Primary Examiner* — Jonathan C Langman
(74) *Attorney, Agent, or Firm* — Bachman & LaPointe, P.C.

(57) ABSTRACT

A thermal barrier system includes a protective coating on a substrate, and a ceramic feature layer attached to the protective coating via an adhesive spray coat.

13 Claims, 6 Drawing Sheets

(51) Int. Cl.
- *B32B 9/04* (2006.01)
- *F01D 9/04* (2006.01)
- *C23C 4/12* (2016.01)
- *B32B 37/12* (2006.01)
- *F01D 11/08* (2006.01)
- *F01D 25/08* (2006.01)
- *B32B 7/12* (2006.01)
- *B32B 9/00* (2006.01)
- *F01D 11/12* (2006.01)

(52) U.S. Cl.
CPC .............. *B32B 9/041* (2013.01); *B32B 37/12* (2013.01); *C23C 4/12* (2013.01); *F01D 9/041* (2013.01); *F01D 11/08* (2013.01); *F01D 11/12* (2013.01); *F01D 11/127* (2013.01); *F01D 25/08* (2013.01); *B32B 2250/02* (2013.01); *B32B 2255/00* (2013.01); *B32B 2255/06* (2013.01); *B32B 2255/20* (2013.01); *B32B 2307/304* (2013.01); *B32B 2603/00* (2013.01); *F05D 2220/32* (2013.01); *F05D 2230/312* (2013.01); *F05D 2230/80* (2013.01); *F05D 2240/12* (2013.01); *F05D 2240/30* (2013.01); *F05D 2240/55* (2013.01); *F05D 2250/283* (2013.01); *F05D 2260/231* (2013.01); *F05D 2300/20* (2013.01); *F05D 2300/22* (2013.01); *F05D 2300/5023* (2013.01); *F05D 2300/611* (2013.01)

(58) Field of Classification Search
CPC ........... F05D 2260/231; F05D 2240/55; F05D 2230/80; F05D 2220/32
See application file for complete search history.

(56) References Cited

U.S. PATENT DOCUMENTS

| | | | |
|---|---|---|---|
| 4,639,388 A * | 1/1987 | Ainsworth | B32B 15/04 428/117 |
| 5,419,971 A | 5/1995 | Skelly et al. | |
| 6,235,370 B1 | 5/2001 | Merrill et al. | |
| 6,846,574 B2 | 1/2005 | Subramanian | |
| 7,041,383 B2 | 5/2006 | Liu et al. | |
| 8,061,978 B2 | 11/2011 | Tholen et al. | |
| 8,357,454 B2 | 1/2013 | Kulkarni et al. | |
| 8,506,243 B2 | 8/2013 | Strock et al. | |
| 8,535,783 B2 | 9/2013 | Lutjen et al. | |
| 2002/0146541 A1 | 10/2002 | Fried | |
| 2002/0197155 A1 | 12/2002 | Howard et al. | |
| 2003/0170119 A1 | 9/2003 | Fried | |
| 2007/0224359 A1 | 9/2007 | Burin et al. | |
| 2008/0044662 A1 | 2/2008 | Schlichting et al. | |
| 2009/0136345 A1 | 5/2009 | Tholen et al. | |
| 2009/0324401 A1 | 12/2009 | Calla | |
| 2010/0247953 A1 * | 9/2010 | Bossmann | C04B 37/005 428/623 |
| 2011/0097538 A1 | 4/2011 | Bolcavage et al. | |
| 2012/0126485 A1 | 5/2012 | Fairbourn et al. | |
| 2013/0317984 A1 | 11/2013 | O'Leary et al. | |

FOREIGN PATENT DOCUMENTS

| | | |
|---|---|---|
| GB | 2272453 A | 5/1994 |
| JP | 2002538302 A | 11/2002 |
| WO | 0052307 A1 | 9/2000 |
| WO | 02092872 A2 | 11/2002 |

OTHER PUBLICATIONS

European Search Report for European Application No. 15191109.6 dated Apr. 29, 2016.

* cited by examiner

THERMAL-SPRAYED BONDING OF A CERAMIC STRUCTURE TO A SUBSTRATE

CROSS REFERENCE TO RELATED APPLICATION

This application claims the benefit of provisional application Ser. No. 62/072,478, filed Oct. 30, 2014.

BACKGROUND

The present disclosure relates to protective coatings and, more particularly, to a ceramic structure thermal spray bonded to a substrate.

Gas turbine engines typically include a compressor section to pressurize airflow, a combustor section to burn a hydrocarbon fuel in the presence of the pressurized air, and a turbine section to extract energy from the resultant combustion gases. Components that are exposed to high temperatures, such as those within a gas path of the gas turbine engine, typically include protective coatings. For example, components such as turbine blades, turbine vanes, blade outer air seals (BOAS), and compressor components (e.g., floatwall panels) typically include one or more coating layers that function to protect the component from erosion, oxidation, and corrosion or the like to enhance component durability and maintain efficient operation.

As one example, some conventional turbine blade outer air seals (BOAS) include an abradable ceramic coating that contacts tips of the turbine blades such that the blade tips abrade the coating upon engine operation. The abrasion between the BOAS and the blade tips provide a minimum clearance between these components such that gas flow around the tips of the blades is reduced to maintain engine efficiency.

The thermal barrier coatings required for next generation BOAS s are required to demonstrate a high level of durability in the ever increasing temperature's in next generation turbines. Although effective, present thermal barrier coatings are limited to about 2500-2800 F (1371-1537 C) surface temperatures due to sintering induced spallation. Current development coating solutions include geometrically segmented ceramic (GSAC) where metallic surface features cause segmentation of the thermal barrier coating during deposition.

The GSAC coating provides durability at surface temperatures in the vicinity of 3000 F (1649 C) but the metallic substrate features are still limited to about 2000 F (1093 C) to prevent oxidation induced spallation. This may be particularly relevant to BOAS applications where the engine run coating thickness varies substantially after rub interaction. This may cause the 2000 F (1093 C) design limitation to be violated in rubbed areas, while higher initial thickness would violate surface temperature limitations.

SUMMARY

A thermal barrier system according to one disclosed non-limiting embodiment of the present disclosure includes a protective coating on a substrate and a ceramic feature layer attached to said protective coating via an adhesive spray coat.

A further embodiment of the present disclosure includes, wherein said protective coating is an environmental coating.

A further embodiment of any of the foregoing embodiments of the present disclosure includes, wherein said protective coating is a bond coat.

A further embodiment of any of the foregoing embodiments of the present disclosure includes, wherein said adhesive spray coat at least partially overfills said ceramic feature layer A further embodiment of any of the foregoing embodiments of the present disclosure includes, wherein said adhesive spray coat at least partially fills said ceramic feature layer.

A further embodiment of any of the foregoing embodiments of the present disclosure includes, wherein said ceramic feature layer forms a lattice structure.

A further embodiment of any of the foregoing embodiments of the present disclosure includes, wherein said ceramic feature layer includes an extended area which facilitates a mechanical interlock between said ceramic feature layer and said protective coating via said adhesive spray coat.

A further embodiment of any of the foregoing embodiments of the present disclosure includes, wherein said extended area is flared.

A further embodiment of any of the foregoing embodiments of the present disclosure includes, wherein said extended area includes an angle of about 5-15 degrees with respect to a side wall of said ceramic feature layer.

A thermal barrier system according to another disclosed non-limiting embodiment of the present disclosure, includes a protective coating on a metallic substrate, the protective coating includes a ceramic material and a ceramic feature layer mechanically interlocked to said protective coating via an adhesive spray coat.

A further embodiment of any of the foregoing embodiments of the present disclosure includes, wherein said ceramic feature layer forms a lattice structure.

A further embodiment of any of the foregoing embodiments of the present disclosure includes, wherein said adhesive spray coat is about 0.003 to 0.030 inch thick.

A further embodiment of any of the foregoing embodiments of the present disclosure includes, wherein said adhesive spray coat at least partially fills said ceramic feature layer.

A further embodiment of any of the foregoing embodiments of the present disclosure includes, wherein said ceramic feature layer forms a honeycomb pattern.

A method of applying a thermal barrier system to a component, according to another disclosed non-limiting embodiment of the present disclosure, includes applying a protective coating to a substrate and mechanically interlocking a ceramic feature layer with the protective coating via an adhesive spray coat thermally sprayed onto the ceramic feature layer and the protective coating.

A further embodiment of any of the foregoing embodiments of the present disclosure includes, wherein the ceramic feature layer is mechanically attached to the protective coating prior to thermally spraying the adhesive spray coat.

A further embodiment of any of the foregoing embodiments of the present disclosure includes, wherein the ceramic feature layer is temporarily tacked to the protective coating prior to thermally spraying the adhesive spray coat.

A further embodiment of any of the foregoing embodiments of the present disclosure includes preforming the ceramic feature layer.

A further embodiment of any of the foregoing embodiments of the present disclosure includes additively manufacturing the ceramic feature layer.

A further embodiment of any of the foregoing embodiments of the present disclosure includes at least partially filling the ceramic feature layer with the adhesive spray coat.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
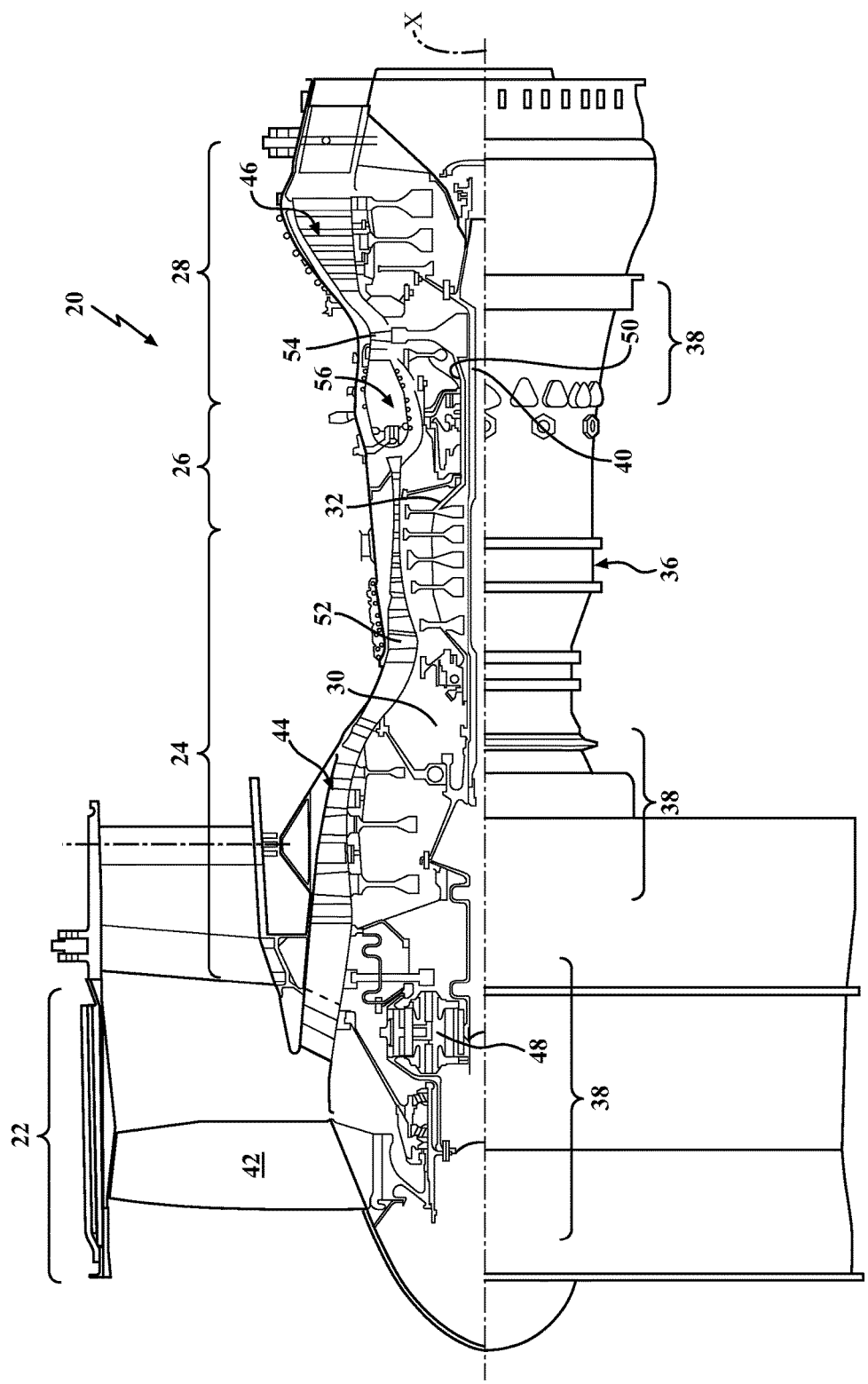
FIG. 1 is a schematic cross-section of an example gas turbine engine architecture.
Figure 2:
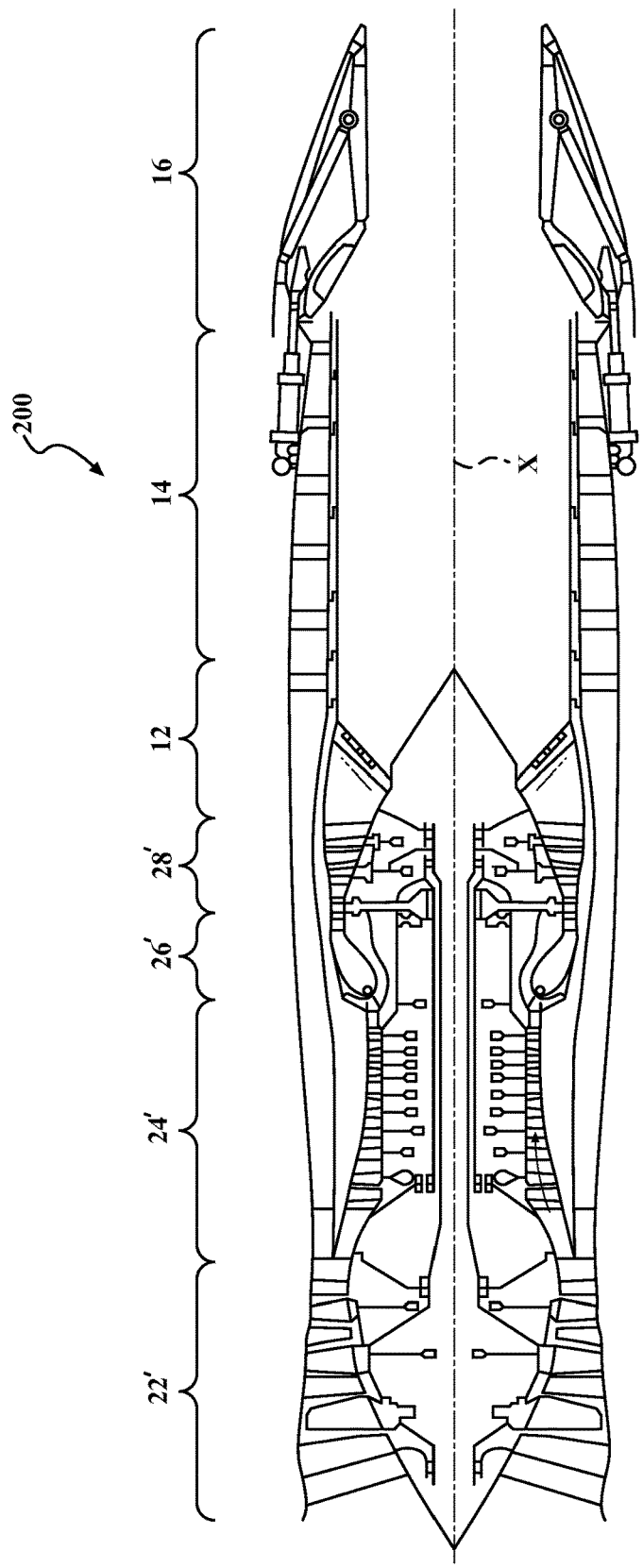
FIG. 2 is a schematic cross-section of another example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engine architectures 200 might include an augmentor section 12, an exhaust duct section 14 and a nozzle section 16 (FIG. 2) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engine architectures such as turbojets, turboshafts, and three-spool (plus fan) turbofans.

The engine 20 generally includes a low spool 30 and a high spool 32 mounted for rotation about an engine central longitudinal axis X relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis X which is collinear with their longitudinal axes.

Core airflow is compressed by the LPC 44 then the HPC 52, mixed with the fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by bearing structures 38 within the static structure 36. It should be understood that various bearing structures 38 at various locations may alternatively or additionally be provided.

Figure 3:
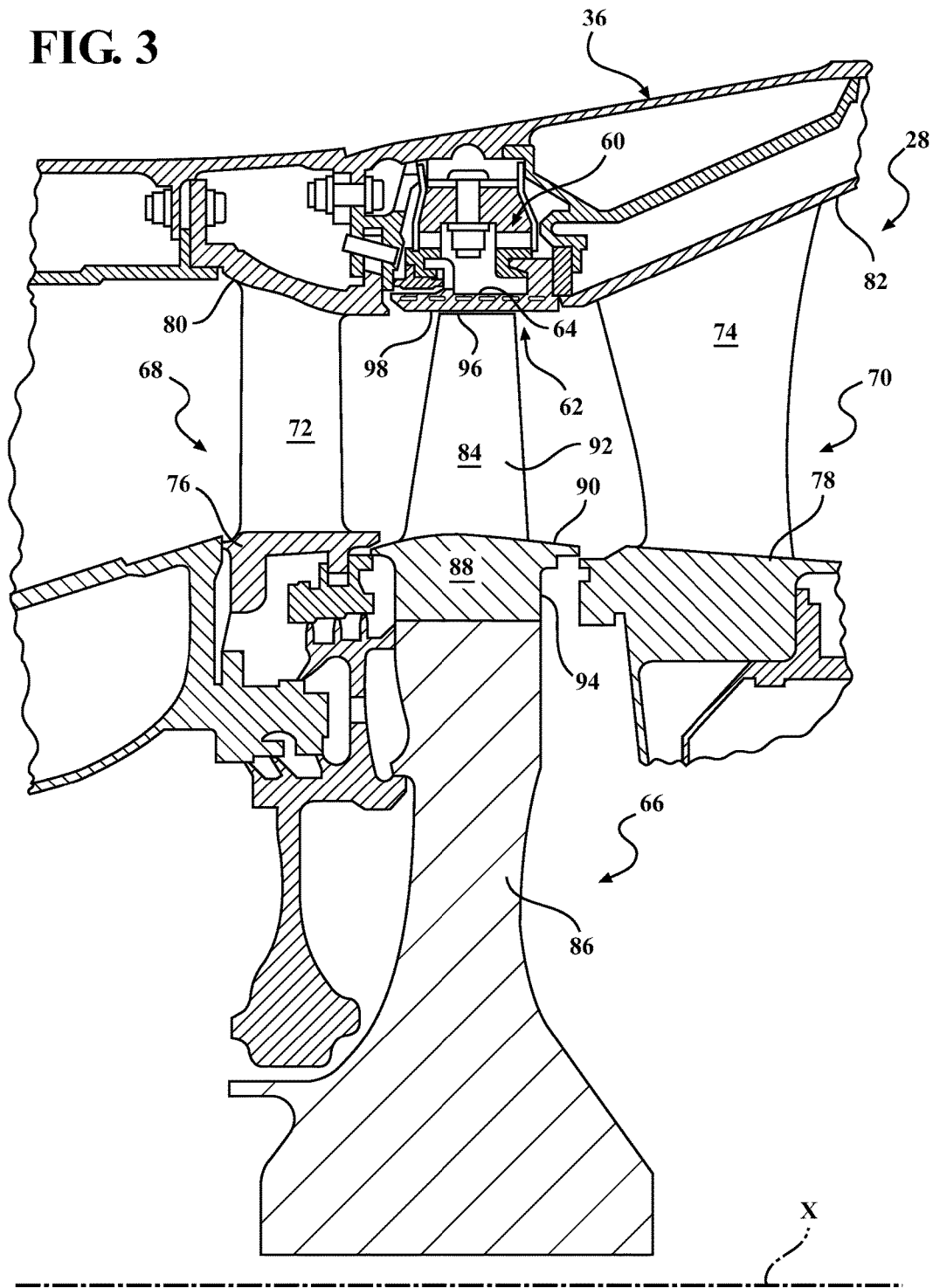
FIG. 3 is an enlarged schematic cross-section of an engine turbine section.

With reference to FIG. 3, an enlarged schematic view of a portion of the turbine section 28 is shown by way of example; however, other engine sections will also benefit herefrom. A full ring shroud assembly 60 within the engine case structure 36 supports a blade outer air seal (BOAS) assembly 62 with a multiple of circumferentially distributed BOAS 64 proximate to a rotor assembly 66 (one schematically shown).

The full ring shroud assembly 60 and the BOAS assembly 62 are axially disposed between a forward stationary vane ring 68 and an aft stationary vane ring 70. Each vane ring 68, 70 includes an array of vanes 72, 74 that extend between a respective inner vane platform 76, 78 and an outer vane platform 80, 82. The outer vane platforms 80, 82 are attached to the engine case structure 36.

The rotor assembly 66 includes an array of blades 84 circumferentially disposed around a disk 86. Each blade 84 includes a root 88, a platform 90 and an airfoil 92 (also shown in FIG. 4). The blade roots 88 are received within a rim 94 of the disk 86 and the airfoils 92 extend radially outward such that a tip 96 of each airfoil 92 is closest to a surface 98 of the multiple of BOAS 64 in the blade outer air seal (BOAS) assembly 62. The platform 90 separates a gas path side inclusive of the airfoil 92 and a non-gas path side inclusive of the root 88.

Figure 4:
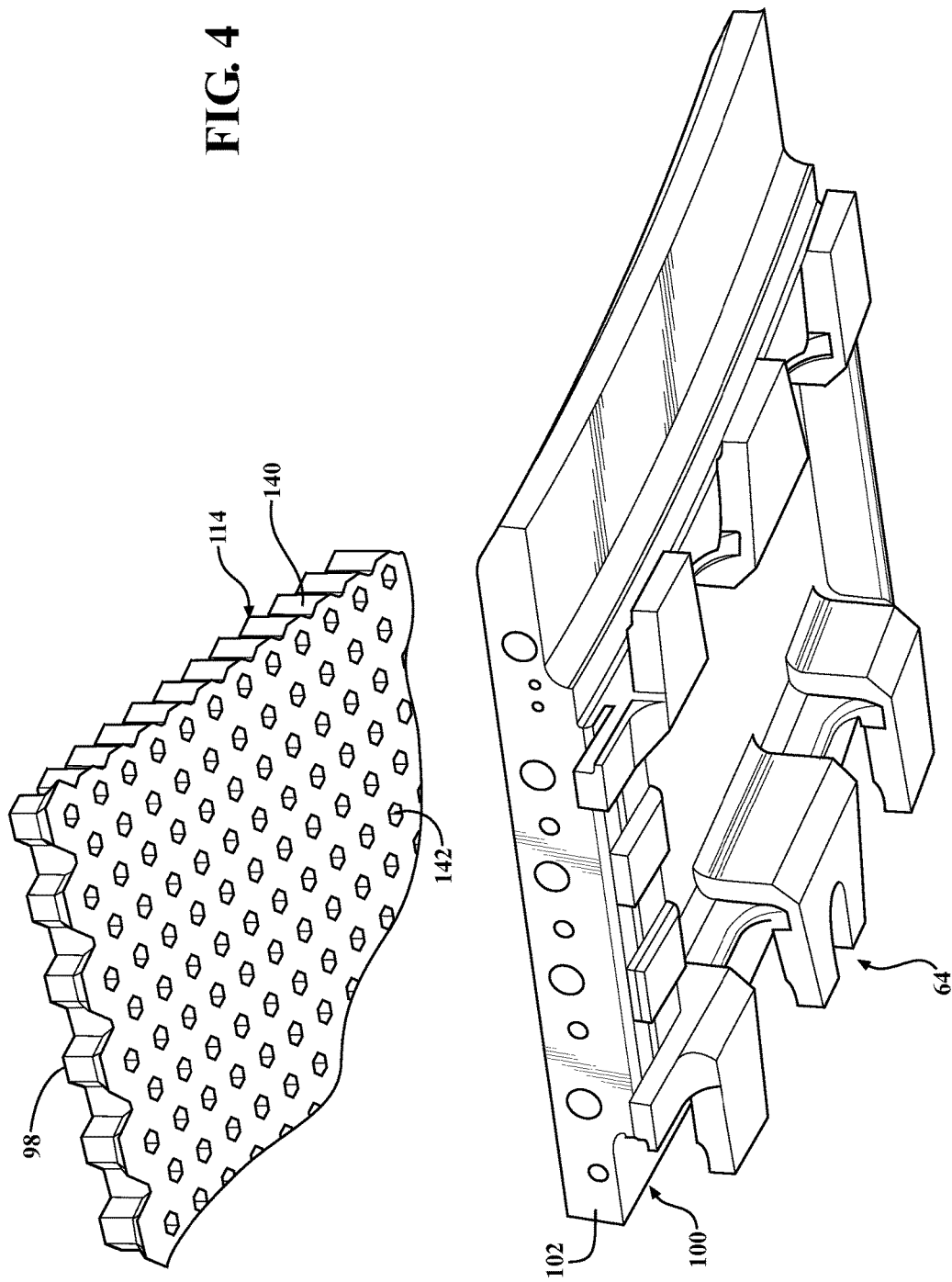
FIG. 4 is an exploded view of a BOAS as an example component.

With reference to FIG. 4, to resist the high temperature stress environment in the gas path of a turbine engine, each BOAS 64 may be formed by casting and is typically manufactured of a nickel-base alloy, and more preferably are a nickel-base superalloy. A nickel-base alloy has more nickel than any other element, and a nickel-base superalloy is a nickel-base alloy that is strengthened by the precipitation of gamma prime or a related phase. A component 100 such as the BOAS 64, and thence a substrate 102 thereof, are thus of nickel-base alloy, and more preferably are a nickel-base superalloy. It should be appreciated that although the BOAS 64 will be described and illustrated in detail as the substrate 102 of the example article, other hot section articles and components including, but not limited to, to combustor section 26 and/or turbine section 28 hardware such as augmentor components, combustor liners, blades, vanes, and other components will also benefit from the teachings herein.

Figure 5:
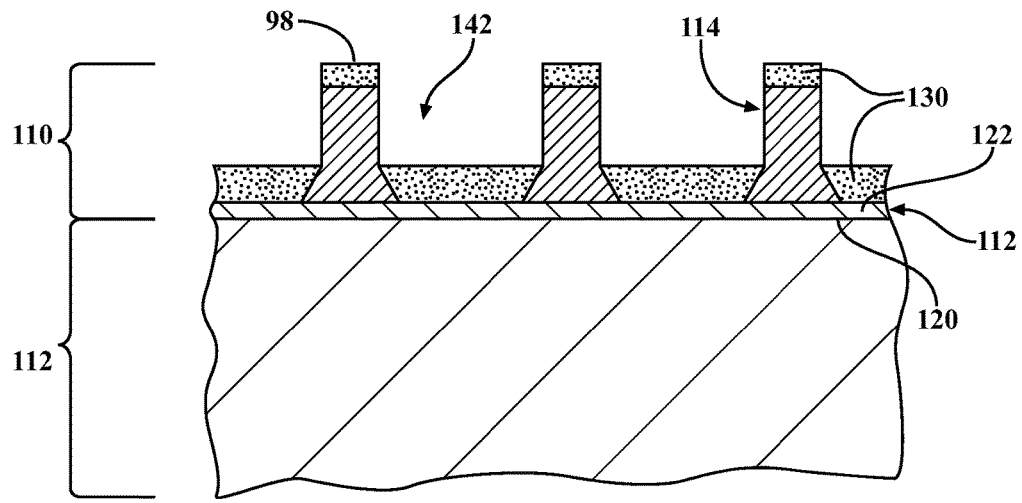
FIG. 5 is a schematic cross-section view of a BOAS substrate.

With reference to FIG. 5, the substrate 102 may be protected by a thermal barrier system 110 that generally includes a protective coating 112 and a ceramic feature layer 114. The thermal barrier system 110, as described herein, is suitable for protection of the substrate 102 manufactured of a superalloy, but while being described with reference to such superalloy gas turbine engine components, the teachings herein are generally applicable to any component on which a Thermal Barrier Coating (TBC) may be used to protect the component from a high temperature environment.

The protective coating 112, in one disclosed non-limiting embodiment initially includes application of a bond layer 120 on the substrate 102. The bond layer 120 may include an aluminum-rich composition, such as an overlay coating or a diffusion coating such as a diffusion aluminide or a diffusion platinum aluminide according to formulas such as MCrAlY, MCrAlY+Hf, and MCrAlY+HF+Si, in which M denotes nickel, cobalt, iron, platinum or mixtures thereof; Cr denotes chromium; Al denotes aluminum; and Y denotes yttrium. MCrAlY materials are often referred to as overlay coatings because they are applied in a predetermined composition and do not interact significantly with the substrate 102 during the deposition process. One example preferred MCrAlY bond layer composition has a weight percent compositional range of 5-40 Cr, 8-35 Al, 0.1-2.0 Y, 0.1-7 Si, 0.1-2.0 Hf, balance selected from the group consisting of Ni, Co and mixtures thereof. Alternatively or in addition the bond layer material may include Al, PtAl and the like, that are often referred to as diffusion coatings. Alternatively or in addition, the bond layer material may also include Al, PtAl, MCrAlY as described above, and the like, that are often referred to as cathodic arc coatings.

The bond layer 120 may be applied by any method operable to produce a dense, uniform, adherent coating of the desired composition, such as, but not limited to, an overlay bond coat, diffusion bond coat, cathodic arc bond coat, etc. Such techniques may include, but are not limited to, diffusion processes (e.g., inward, outward, etc.), low pressure plasma-spray, air plasma-spray, sputtering, cathodic arc, electron beam physical vapor deposition, high velocity plasma spray techniques (e.g., HVOF, HVAF), combustion processes, wire spray techniques, laser beam cladding, electron beam cladding, etc. The bond layer 120 may be applied to any suitable thickness, and may be about 0.006" (5 mils; 0.127 mm) to about 0.01" (10 mils; 0.254 mm) thick. In some more specific examples, the thickness may be about 0.006" (6 mils; 0.152 mm) to about 0.007" (7 mils; 0.178 mm) thick. In one example, CATARC bond/oxidation coating thicknesses are generally less than about 0.001" (1 mil; 0.025 mm).

Next, a ceramic layer 122, often referred to as a top coat, may be applied to the bond layer 120. The ceramic layer 122 may include a ceramic based compound that include, but are not limited to, a stabilized zirconate, a stabilized hafnate, combinations including at least one of the following compounds, and the like, for example, gadolinia stabilized zirconia, yttria stabilized zirconia, calcia stabilized zirconia, magnesia stabilized zirconia, yttria stabilized hafnia, calcia stabilized hafnia and magnesia stabilized hafnia. Yttria stabilized zirconia is commercially available as 7YSZ. One example ceramic layer 122 is about 0.05-5 mil (0.00127-0.127 mm) in thickness deposited, nominally at 1-3 mil (0.0254-0.0761 mm).

The ceramic layer 122 may be applied by various application methods to include, but are not limited to, physical vapor deposition (e.g., electron beam), thermal spray (e.g., air plasma, high velocity oxygen fuel), sputtering, sol gel, slurry, combinations comprising at least one of the foregoing application processes, and the like.

The protective coating 112 may thus include the bond layer 120 and the ceramic layer 122. Typically, the bond layer 120 has a temperature capability less than that of the ceramic layer 108, optionally, when there is no ceramic layer present, the protective coating 112 is often termed an "environmental coating." When there is a ceramic layer 122 present, the protective coating 112 is often termed a "bond coat."

The ceramic feature layer 114 (best seen in FIG. 4) overlays the protective coating 112 and is bonded thereto via an adhesive spray coat 130. The ceramic feature layer 114 may be formed separate from the substrate and applied as a pre-formed ceramic layer via mechanical interlocking provided by the adhesive spray coat 130.

Figure 6:
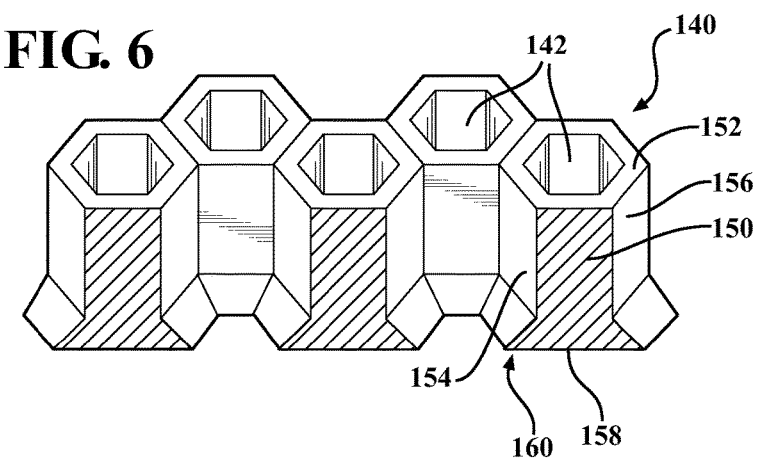
FIG. 6 is a perspective view of a ceramic feature layer lattice structure according to one disclosed non-limiting embodiment.

The ceramic feature layer 114 may include, for example, a ceramic based compound to include, but not be limited to, yttria-stabilized zirconia (YSZ), gadolinia-stabilized zirconia (GSZ), or other ceramic material that is preformed to provide a particular lattice structure 140. The lattice structure 140 may be of a honeycomb, circular, rectangular, triangular or other pattern with a multiple of openings 142 (FIG. 6).

Figure 7:
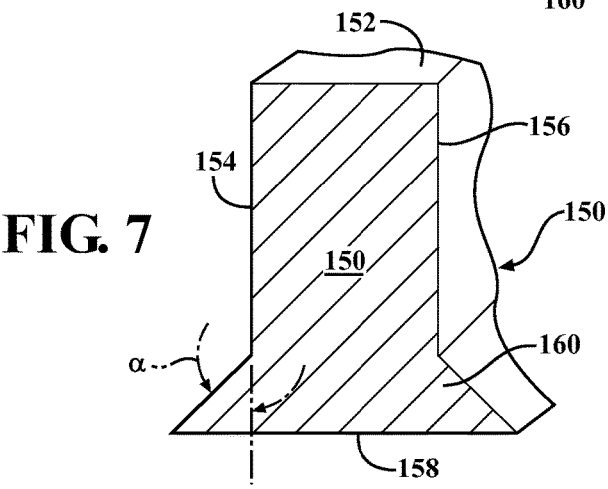
FIG. 7 is an expanded view of one wall of the ceramic feature layer.

In one disclosed non-limiting embodiment, the ceramic feature layer 114 includes a multiple of interconnected walls 150 that form the lattice structure 140. Each of the multiple of interconnected walls 150 include a top surface 152, side surfaces 154, 156, and bottom surface 158. The bottom surface 158 may be enlarged with respect to the top surface 152 along the side surfaces 154, 156. In one example, the side surfaces 154, 156 include an extended area 160 such that the bottom surface 158 is enlarged with respect to the top surface 152. The extended area 160, in one example, may be flared at an angle of, for example, about 5-15 degrees (FIG. 7). The ceramic feature layer 114 may be formed separate from the substrate 102 and applied as a pre-formed ceramic layer via mechanical interlocking provided by the extended area 160 and the adhesive spray coat 130 applied thereover.

The ceramic feature layer 114 may be machined from a solid piece, powder pressed and sintered in a near net shape, or via an additive manufacturing process that includes, but are not limited to, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD) and Laser Powder Bed Fusion (LPBF). The additive manufacturing process sequentially builds-up layers of ceramic powder material to form the relatively complex geometry of the ceramic feature layer 114. Although particular additive manufacturing processes are disclosed, it should be appreciated that any other suitable rapid manufacturing methods using layer-by-layer construction or additive fabrication can alternatively, or additionally, be utilized.

The adhesive spray coat 130 may be a thermally sprayed ceramic material such as that similar to the ceramic layer 122 and is typically from about 0.003 to 0.030 inch thick. Thermal spraying techniques are coating processes in which melted (or heated) materials are sprayed onto a surface. The "feedstock" (coating precursor) is heated by electrical (plasma or arc) or chemical means (combustion flame). Example thermally sprayed ceramic material include, but are not limited to, Alumina (Aluminum Oxide, Al2O3, Zirconia (Zirconium Oxide, ZrO2, Chromium Oxide (Cr2O3, Titania (TiO2), Yttria stabilized Zirconia (YSZ thermal barrier coatings, ZrO2-Y2O3), and gadolinia-stabilized zirconia (GSZ). The adhesive spray coat 130 may completely, partially fill, or over fill the openings 142 of the ceramic feature layer 114 to form a filled "divot" and thus complete the thermal barrier system 110. In one example, the adhesive spray coat 130 may overfill the openings 142 to about twice or more the thickness of the ceramic feature layer 114.

In another disclosed non-limiting embodiment, the adhesive spray coat 130 replaces the ceramic layer 122 such that the ceramic feature layer 114 is located directly upon the bond layer 120. For example, the adhesive spray coat 130 may be bond coat composition or ceramic composition.

Figure 8:
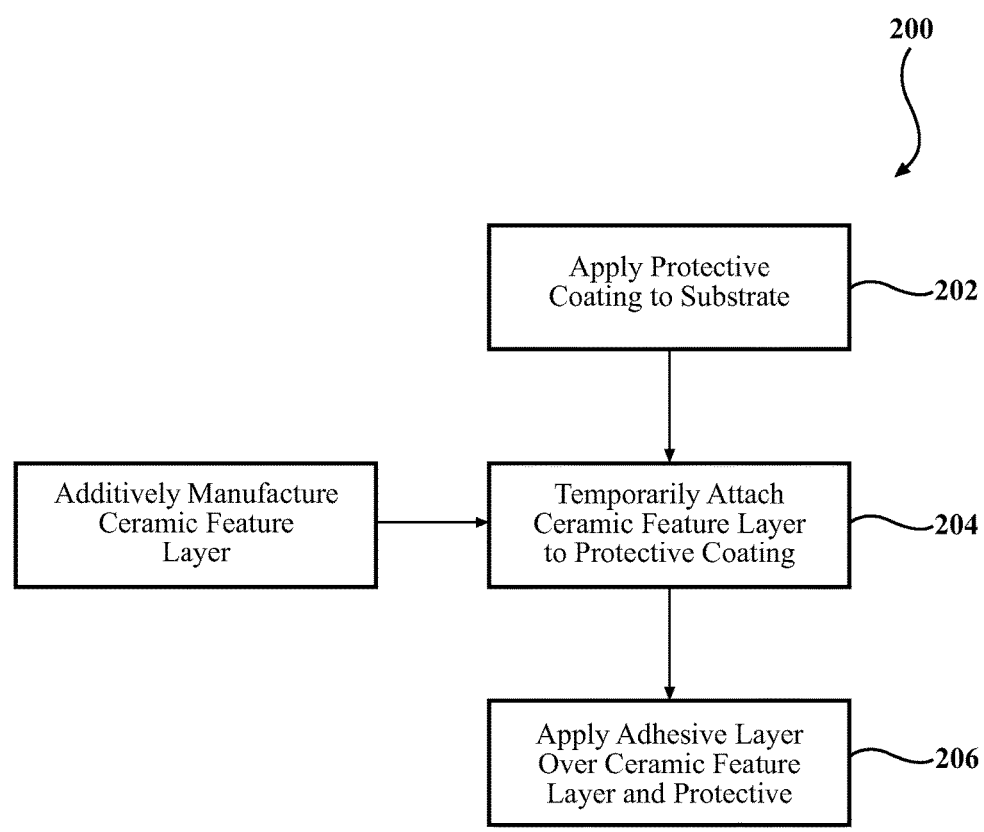
FIG. 8 is a method of manufacturing the thermal barrier system.

With reference to FIG. 8, one disclosed non-limiting embodiment of a manufacture method 200 is schematically disclosed. The steps of the method 200 are schematically disclosed in terms of functional block diagrams as a flowchart that initially includes application of the protective coating 112 applied directly to the substrate 102 (step 202). Next, the previously manufactured ceramic feature layer 114 is temporarily attached to the protective coating 112 (step 204). The temporary attachment may be achieved via, for example, a mechanical attachment such as a clamp, or a tack adhesive to hold the ceramic feature layer 114 in position for application of the adhesive spray coat 130 (step 206). That is, the thermally sprayed adhesive spray coat 130 may completely, or partially, fill the lattice structure of the ceramic feature layer 114 to attach the ceramic feature layer 114 in an essentially unitary manner with the protective coating 112 and the substrate 102 to complete the thermal barrier system 110 therefor. It should be appreciated that alternative of addition steps may be provided without departing from the teaching herein.

The thermal barrier system 110 beneficially supersedes GSAC in both temperature capability and manufacturability. From the temperature capability perspective, the thermal barrier system 110 eliminates the metallic layer at mid coating thickness for GSAC by replacing metallic features with the ceramic feature layer 114. This allows the 2000 F (1093 C) interface limit to move deeper into the coating system to the substrate interface and allows the height of the "substrate features" to essentially be part of the ceramic coating layer. This provides better substrate protection for a given rub depth and surface temperature combination. From the manufacturing point of view, conventional metallic GSAC is relatively sensitive to the divot geometry and the spray process to obtain the desired crack propagation through the ceramic layer. The ceramic feature layer 114 inherently forms a discontinuity and does not require propagation through additional coating thickness which permits a greater effective tolerance for the divot formation.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A thermal barrier system, comprising:
   a protective coating on a substrate; and
   a ceramic feature layer attached to said protective coating via an adhesive spray coat, said ceramic feature layer comprises a flared extended area to facilitate a mechanical interlock between said ceramic feature layer and said protective coating via said adhesive spray coat that partially fills said ceramic feature layer such that said ceramic feature layer at least partially extends from said adhesive spray coat.

2. The thermal barrier system as recited in claim 1, wherein said protective coating is an environmental coating.

3. The thermal barrier system as recited in claim 1, wherein said protective coating is a bond coat.

4. The thermal barrier system as recited in claim 1, wherein said adhesive spray coat at least partially fills said ceramic feature layer.

5. The thermal barrier system as recited in claim 1, wherein said ceramic feature layer forms a lattice structure.

6. The thermal barrier system as recited in claim 5, wherein said lattice structure forms a pattern with a multiple of openings, said adhesive spray coat at least partially fills said openings.

7. The thermal barrier system as recited in claim 5, wherein said lattice structure forms a honeycomb pattern, said adhesive spray coat at least partially fills said honeycomb pattern.

8. The thermal barrier system as recited in claim 1, wherein said flared extended area includes an angle of about 5-15 degrees with respect to a side wall of said ceramic feature layer.

9. A thermal barrier system, comprising:
   a protective coating on a metallic substrate, the protective coating includes a ceramic material; and
   a ceramic feature layer mechanically interlocked to said protective coating via an adhesive spray coat, said ceramic feature layer comprises a flared extended area to facilitate the mechanical interlock between said ceramic feature layer and said protective coating via said adhesive spray coat that partially fills said ceramic feature layer such that said ceramic feature layer at least partially extends from said adhesive spray coat.

10. The thermal barrier system as recited in claim 9, wherein said ceramic feature layer forms a lattice structure.

11. The thermal barrier system as recited in claim 10, wherein said adhesive spray coat is about 0.003 to 0.030 inch thick.

12. The thermal barrier system as recited in claim 10, wherein said adhesive spray coat at least partially fills said ceramic feature layer.

13. The thermal barrier system as recited in claim 10, wherein said ceramic feature layer forms a honeycomb pattern.

\* \* \* \* \*